(12) United States Patent
Menden

(10) Patent No.: US 6,594,017 B1
(45) Date of Patent: Jul. 15, 2003

(54) MEASURING SENSOR POSITIONING

(75) Inventor: Joachim Menden, Wutoeschingen (DE)

(73) Assignee: Alstom, Paris (FR)

(*) Notice: Subject to any disclaimer, the term of this patent is extended or adjusted under 35 U.S.C. 154(b) by 336 days.

(21) Appl. No.: 09/671,303

(22) Filed: Sep. 28, 2000

(30) Foreign Application Priority Data

Sep. 30, 1999 (DE) .......................... 199 46 921

(51) Int. Cl.$^7$ .............................................. G01N 21/85
(52) U.S. Cl. .................. 356/441; 356/442; 138/40; 138/44; 251/175; 251/193
(58) Field of Search ................. 356/441, 442, 356/446; 73/198, 866.5; 138/40, 44; 251/175, 193

(56) References Cited

U.S. PATENT DOCUMENTS

| 4,387,592 A | 6/1983 | Welker |
| 4,841,787 A | 6/1989 | Waterman |
| 5,042,531 A | 8/1991 | Foster et al. |

FOREIGN PATENT DOCUMENTS

| DE | 3644100 A1 | 7/1988 |
| DE | 9104279.8 | 7/1991 |
| DE | 4200452 A1 | 7/1993 |
| DE | 29508120 U1 | 9/1995 |
| DE | 19546927 A1 | 6/1997 |
| DE | 29721863 U1 | 3/1999 |
| EP | 0 092 910 | 11/1983 |
| EP | 0 176 906 | 4/1986 |
| GB | 2 049 953 | 12/1980 |
| GB | 2 113 353 | 8/1983 |

Primary Examiner—Richard A. Rosenberger
Assistant Examiner—Vincent P. Barth
(74) Attorney, Agent, or Firm—Burns, Doane, Swecker & Mathis, L.L.P.

(57) ABSTRACT

The invention relates to a device and a method for moving a measuring sensor (2) into and out of a pressurized or flow-through conduit (1) or a pressurized or flow-through vessel. The device according to the invention comprises, in this case, a holding element (3) for holding the measuring sensor (2), a guiding element (4) for guiding the holding element (3) and a volume element (5). The holding element (3) can be moved in such a way that the measuring sensor (2) held by the holding element comes to rest in a position completely in the volume element (5). In this position, the measuring sensor (2) can be removed from the holding element (3). With the aid of the device according to the invention and the method according to the invention, it is possible, in particular, to measure the cleanliness of a conduit system blown out with a fluid, without the blow-out operation being interrupted.

22 Claims, 5 Drawing Sheets

MEASURING SENSOR POSITIONING

This application claims priority under 35 U.S.C. §§119 and/or 365 to Appln. No. 199 46 921.0 filed in Germany on Sep. 30, 1999, now published as German Offenlugungsschrift DE 19946921 A1; the entire content of which is hereby incorporated by reference.

FIELD OF THE INVENTION

The invention relates to methods and devices for cleaning pipe conduits, and, more particularly to methods and devices for temporarily removing measuring sensors from the pipe conduits during the cleaning process.

BACKGROUND OF THE INVENTION

In many applications, it is necessary to clean conduits or vessels before they are put into operation. Putting into operation may, in this case, be commissioning, during which any residues from the manufacturing process must be removed beforehand, or else recommissioning. In the latter instance, residues from prior use, for example residues of a chemical substance, often have to be removed. To clean such conduits or vessels, it is frequently expedient to blow them out with steam. Thus, for example, the water/steam circuit of a power station is also blown out, as a rule with steam, before the power station is put into operation, in order to remove residues. So that the degree of cleanliness can be measured, a metallic mirror is positioned at a suitable location in the flow. The number of particle impacts within a specific period of time is then evaluated as a measure of cleanliness.

Due to the way in which the mirror has usually been mounted hitherto, above all the operation of changing the mirror has presented problems, particularly with regard to relatively long conduit systems closed on themselves. The mirror is usually installed in the conduit or vessel at a suitable location in a nonadjustable arrangement which cannot be demounted during the blow-out operation. The conduit or vessel is subsequently blown out. For this purpose, the conduit or vessel is mostly subjected to excess pressure. Furthermore, because of the high temperatures of the steam, the conduit or vessel usually has a high temperature. So that the degree of cleanliness of the conduit or vessel can be determined after a predefined measuring time has elapsed, then, it is necessary to remove the measuring mirror from the conduit or vessel and count the particle impacts. For this purpose, the blow-out operation has hitherto had to be discontinued, in order to demount the measuring mirror from the conduit or vessel. However, it has been possible to demount the measuring mirror only after the pressure in the conduit or vessel has been discharged. Also, the conduit or vessel has first had to be cooled to an extent such that demounting work could be carried out on it. For this reason, the operation of blowing out the water/steam circuit of a power station has hitherto had to be interrupted, as a rule, for several days in total, merely in order to remove the respective measuring mirrors from the flow and/or in each case position a new measuring mirror in the flow.

SUMMARY OF THE INVENTION

The object of the invention is, therefore, to provide a device and a method, with the aid of which it is possible to position a measuring sensor in and remove it from a pressurized or flow-through conduit or a pressurized or flow-through vessel, without the pressure previously having to be discharged or the flow through the conduit or vessel having to be interrupted.

The device according to the invention for moving a measuring sensor into and out of a pressurized or flow-through conduit or a pressurized or flow-through vessel comprises a holding element for holding the measuring sensor, a guiding element for guiding the holding element and a volume element. The holding element may, in this case, be positioned in such a way that the measuring sensor held by the holding element is arranged in the interior of the volume element. Furthermore, the volume element is capable of being sealed off relative to the conduit or the vessel by means of at least one sealing-off device. Preferably, furthermore, the device also comprises a second sealing-off device which is executed preferably separately from the first sealing-off device and by means of which the volume element is capable of being sealed off relative to the surroundings.

It is thus possible for the fluid located in the volume element to be separated completely from the fluid located in the conduit or vessel. At the same time, the volume element is open to the surroundings or, in the case of the preferred version of the device with a second sealing-off device which seals off the volume element relative to the surroundings, may be opened to the surroundings. Thus, in this state, fluid exchange and consequently also pressure equalization between the fluid located in the volume element and the fluid of the surroundings may take place. It is thereby possible to remove the measuring sensor located in the volume element from the holding element or else arrange a new measuring sensor in the holding element, without this necessitating a disruption in the flow through the conduit or vessel or even a discontinuation of the throughflow operation. Furthermore, there is also no further need to equalize any overpressure or underpressure in the conduit or vessel in relation to the pressure of the surroundings in order to make it possible to change the sensor.

In principle, for the purpose of mounting or removing the measuring sensor, it is possible to leave the holding element in the guiding element and therefore mount or demount only the measuring sensor or to remove the holding element together with the measuring sensor from the guiding element in order to carry out the mounting and demounting of the measuring sensor in the demounted state.

If, in a preferred version, the second sealing-off device is also arranged according to the invention, it is thereby advantageously possible, on the one hand, to seal off the volume element relative to the surroundings and, on the other hand, to open said volume element relative to the fluid located in the conduit or vessel. In the event of a pressure difference between the surrounding pressure and the pressure in the conduit or vessel, there is in this case merely a pressure equalization of the pressure in the conduit or vessel and the pressure in the volume element, but no permanent flow through the volume element. In this state, the holding element may be moved or displaced through an introduction orifice located in the conduit or vessel, in such a way that the measuring sensor located in the holding element projects into the region of the flow or into the region of the fluid located in the conduit or vessel or else is arranged completely in the flow. Accordingly, measurement can be carried out, with the measuring sensor in this position, without disruption being caused by an inflow or an outflow of fluid through the introduction orifice of the holding element.

Thus, with the aid of the device according to the invention, it is no longer necessary to interrupt the flow through the conduit or vessel or to vent the conduit or vessel relative to the surroundings so that the measuring sensor can be introduced into or removed from the conduit or vessel. In particular, it is also possible to renew the measuring sensor, without at the same time having to interrupt the operation of blowing through the conduit or vessel. This results in enormous amounts of time being saved, as compared with the previous measurement sequence. As regards the application in which a water/steam circuit of a power station is cleaned, a time saving of up to several days can be achieved as compared with cleaning methods conventional hitherto, as result of the use of the device according to the invention.

In a preferred embodiment, the volume element is designed as a T-shaped tubular piece with at least three orifices, two orifices serving for leading the guide or the holding element and a further orifice expediently being designed as an inspection orifice for mounting or demounting and removing the measuring sensor. The two orifices serving for leading through the guide are preferably arranged in alignment with one another. In a simple version, the inspection orifice is designed as a handhole and is closed by means of a simple screwable lid. The volume element advantageously has an interspace having a diameter larger than the diameters of the orifices. As a result, the accessibility of the measuring sensor in the region of the interspace is increased and the mounting work is therefore made easier.

Preferably, the volume element is designed to be thermally insulated relative to the conduit or vessel. This is advantageous, in particular, when the fluid carried in the conduit or vessel has high temperatures. The thermal insulation, which consists, for example, of a material layer of low thermal conductivity arranged between the conduit or vessel and the volume element, prevents the material of the volume element having temperatures which are too high, in particular on its outside. High temperatures on the outside of the volume element could result in the situation where work to be carried out on the volume element by operators may be possible only after a cooling phase.

Expediently, a stop element, preferably a stop valve, is arranged, as a sealing-off device for sealing off the conduit or vessel relative to the volume element, between the conduit or vessel and the volume element. Such stop elements are known in a wide variety of versions in the prior art and are obtainable cost-effectively in the trade. Furthermore, such stop elements can be activated and regulated in a simple way either manually or electronically.

Preferably, furthermore, a vent valve communicating with the volume element is arranged. By means of this vent valve, after the volume element has been sealed off completely, it is possible in a simple way, by opening the vent valve, to equalize an overpressure or underpressure possibly present in the volume element relative to the surroundings. Particularly when a larger orifice, for example a handhold, has to be opened in the volume element for mounting or demounting the measuring sensor, it is expedient, before the handhole is opened, to achieve pressure equalization between the fluid in the volume element and the surrounding air pressure. Vent valves suitable for this purpose are known in the prior art and are obtainable in the trade.

Particularly for measuring the cleanliness of a conduit system or of a water/steam circuit of a power station, it is especially expedient to use a metallic mirror as measuring sensor. A conduit system consists, in this context, of at least one conduit or one pipe conduit and/or also of at least one vessel. The conduit system is, in this case, cleaned preferably with steam which is blown through the conduit system. The metallic mirror is, in this case, introduced into the flow in such a way that the flow strikes the mirror frontally. Particles entrained by the steam therefore strike the front side of the mirror and leave impact traces behind there. The number of impact traces within a specific measurement period is, in this case, a measure of the cleanliness of the conduit system.

In order to connect the device according to the invention to the respective conduit or respective vessel, the device expediently comprises, furthermore, a connecting element, preferably a weld-on flange. In this case, this connecting element is connected on one side directly to the conduit or vessel and on the other side advantageously to the stop element. In an expedient version, the connecting element is welded nonreleasably to the conduit or vessel, whereas the connection between the connecting element and the stop element is advantageously made by means of a flanged connection. The connection between the connecting element and the stop element is therefore releasable, so that the device according to the invention can be removed and used elsewhere after the cleaning process.

The method according to the invention for measuring the cleanliness of conduits, in particular of conduits or pipe conduits of a water/steam circuit of a power station, and/or the cleanliness of a vessel, a fluid cleaning the conduits and/or the vessel flowing through the conduits and/or the vessel, comprises the work steps listed below:

arrangement of a measuring sensor in a holding element, the holding element previously having been moved to a first position for the purpose of arranging the measuring sensor, and the first position being within a first region which is initially sealed off relative to the fluid;

preferably complete sealing-off of the first region;

connection of the first region to the fluid, so that fluid can flow out of the conduit into the region of the measuring sensor;

movement of the sensor out of the first region into a second region, the second region being located within the flowing fluid;

dwelling of the sensor in the second region for a measurement period;

after the end of the measurement period: movement of the sensor out of the second region into the first region;

sealing-off of the first region relative to the fluid;

preferably opening of the first region relative to the surroundings;

removal of the measuring sensor from the holding element and/or determination of a measurement value.

In order to carry out the method, a device according to the invention, as described above, may advantageously be used in this case.

As compared with the methods known hitherto for measuring the cleanliness of conduits, in particular of a water/steam circuit of a power station, and/or a vessel, the blowing-through of the conduit system and/or of the vessel and therefore the cleaning process do not have to be interrupted in order to carry out the method according to the invention for measuring cleanliness. This results in a marked time saving over the entire duration of the cleaning process.

The method step described last above is advantageously subdivided into the work steps of opening a vent valve to achieve pressure equalization between the pressure of the fluid in the first region and a surrounding pressure, and of subsequently opening an inspection orifice of the first region.

DESCRIPTION OF THE DRAWINGS

A preferred embodiment of the invention is described in the accompanying specification and is illustrated in the accompanying drawings in which.

DETAILED DESCRIPTION OF THE INVENTION

Figure 1:
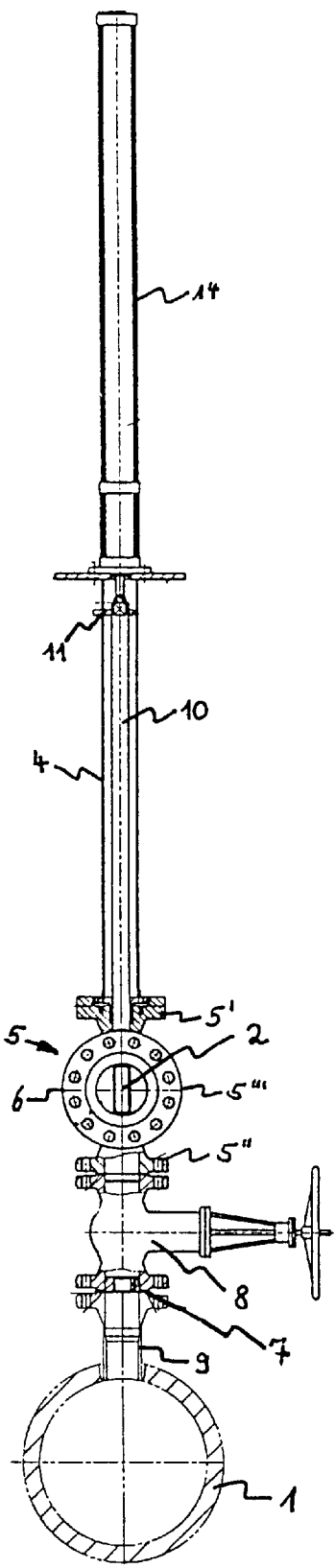
FIG. 1 is a front elevational view of a device according to the invention for measuring the cleanliness of a pipe conduit, the measuring sensor being moved into a first position.

FIG. 1 shows a front view of a device according to the invention for measuring the cleanliness of a conduit. The conduit is designed, here, as a pipe conduit 1 of circular cross section and is blown out with steam or another fluid for cleaning.

Figure 4:
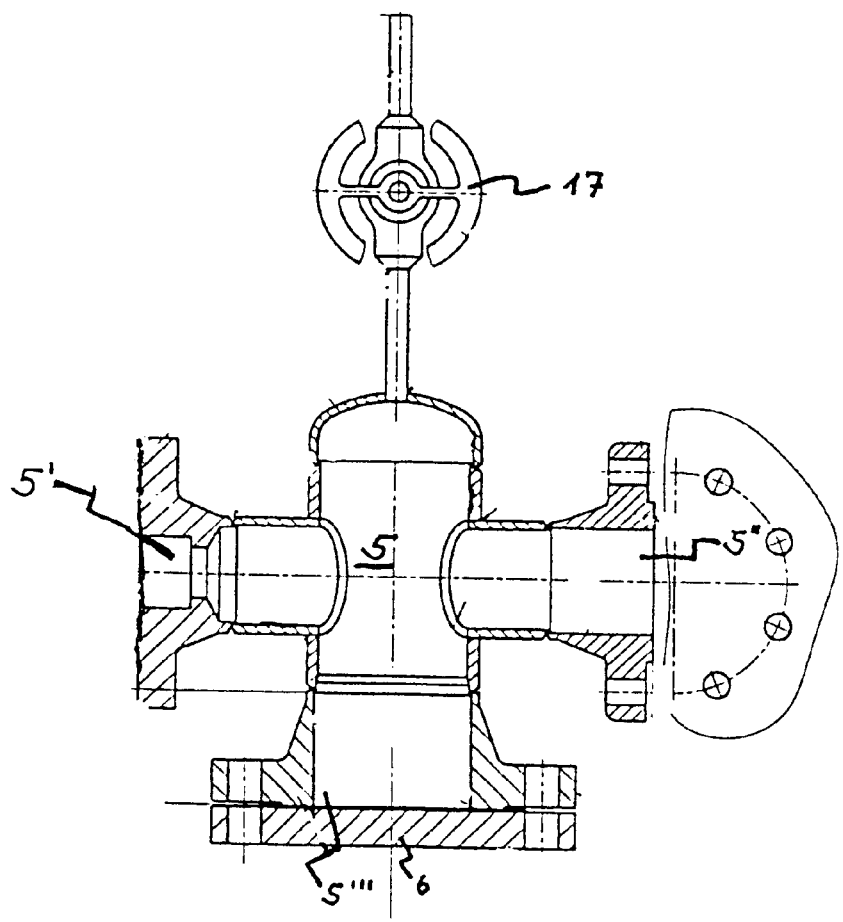
FIG. 4 is a cross-sectional view of the volume element of the device of FIG. 1.

The measuring sensor 2 illustrated in FIG. 1 is moved into a first position, so that it is arranged completely in the volume element 5. The volume element is designed, here, as a T-shaped tubular piece with three connecting branches as shown in FIG. 4. Two connecting branches 5', 5" are in alignment with one another, whereas the third connecting branch 5''' is arranged at right angles to the connecting axis of the first two connecting branches 5', 5". The third connecting branch 5''' is provided with a flange 6 which can expediently be closed by means of a first sealing-off device. The first sealing-off device is designed, here, as a dummy flange, the dummy flange being demounted in FIG. 1. Advantageously, both the third connecting branch 5''' as an inspection branch and the interior of the volume element 5 are designed with a large cross section, so that demounting of the measuring sensor 2 when the latter is arranged in the interior of the volume element 5 can be carried out.

A metallic measuring mirror, which is held in the holding element 3, is used here as the measuring sensor 2. The holding element 3, in turn, is guided in the guiding element 4 and is displaceable along its longitudinal axis in the guiding element 4. The guiding element 4 illustrated here consists essentially of a tubular piece which is provided at its ends with flanged disks or connecting elements. Furthermore, the tubular piece has a slotted groove running in the longitudinal direction. The holding element 3 consists essentially of a moving bar 10, to which a guiding plate 11 is fastened. The guiding plate 11 has a nose on at least one side, as illustrated, the nose engaging into the slotted groove of the tubular piece in the assembled arrangement. In the case of a plurality of noses, a plurality of slotted grooves must also be made correspondingly in the tubular piece, the holding element 3 being guided in the longitudinal direction of displacement along these slotted grooves. Furthermore, fixing devices or fixing elements are attached to the ends of the moving bar 10. The fixing device attached to that end of the moving bar 10 which faces the pipe conduit 1 serves for fastening and holding the measuring sensor 2. In the version of the invention, as illustrated here, the metallic measuring mirror is in a simple way fastened and held on the moving bar in a clearance of the latter by means of the screw connection. The moving bar 10 can be connected to a drive device with the aid of the fixing device attached to the other end.

Figure 3:
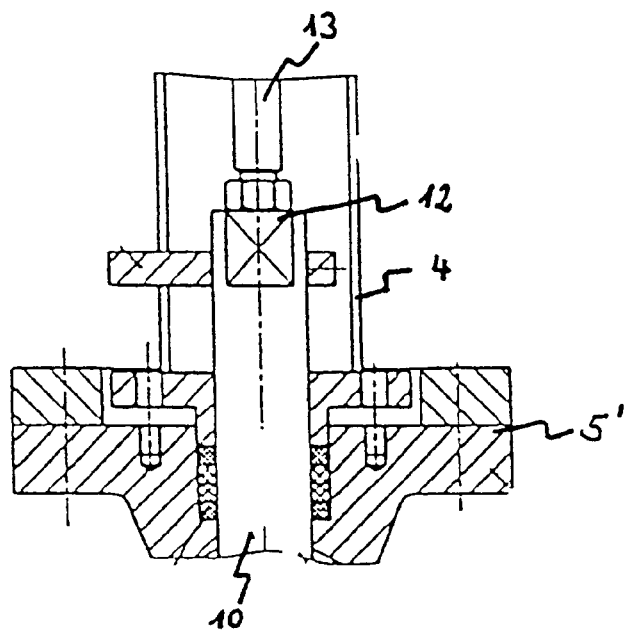
FIG. 3 is a detail cross-sectional view of the transitional region between the volume element and the guiding element of the device of FIG. 1.

A fixing device 12 for fastening the moving bar 10 to a lifting bar 13 of a drive device is illustrated, enlarged, in FIG. 3. The moving bar 10 is screwed to the lifting bar 13 here and is additionally locked by means of a nut.

Furthermore, FIG. 3 illustrates a flanged connection between the connecting branch 5' of the volume element and the guiding element 4.

Figure 5:
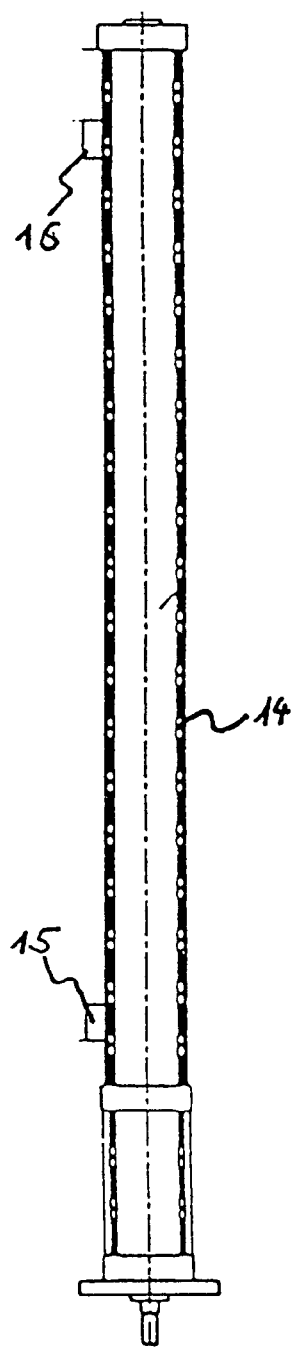
FIG. 5 is a cross-sectional view of the guiding element of the device of FIG. 1.

As shown in FIG. 1, the lifting bar 13 is located in a pneumatic cylinder 14 which is flanged to the guiding element 4. In this case, the pneumatic cylinder 14 is activated via a control unit, not illustrated in FIG. 1, and pneumatic control lines, with the result that the lifting bar 13 arranged in the cylinder 14 moves in height. The moving bar 10 fastened to the lifting bar 13 and the measuring sensor 2 held by the moving bar 10 are accordingly likewise displaced in the longitudinal direction. As illustrated in FIG. 5, the movement travel of the lifting bar 13 is limited by two switches 15, 16 which in each case transmit a control signal to the control unit when the end position is reached. In this case, the switches 15, 16 are preferably individually adjustable, so that the lifting travel of the lifting bar 13 and therefore the displacement travel of the measuring sensor 2 can be adapted to the respective conditions.

In FIG. 1, a second sealing-off device and a connecting element 9 are arranged between the volume element 5 and the pipe conduit 1. A manually adjustable stop valve 8 is used as the second sealing-off device here. The stop valve 8 is flanged, on one side, to the volume element 5. On the other side, the stop valve 8 directly adjoins the connecting element 9 and is releasably connected to the latter by means of a flanged connection. In the version of the invention, as illustrated here, the connecting element 9 and the stop valve 8 have inserted between them a sealing disk 7 which here, on the one hand, ensures that the flanged connection is sealed off and, on the other hand, brings about thermal insulation of the volume element relative to the conduit. Such a sealing disk for the thermal insulation of the volume element relative to the conduit may likewise also be inserted into the flange connection between the stop valve and the volume element. The connecting element 9 is designed, here, as a weld-on flange with a prolonged tubular extension. The pipe conduit 1 to be cleaned has an orifice for receiving the tubular extension of the connecting element 9. The tubular extension of the connecting element 9, said tubular extension being inserted into this orifice, is welded to the pipe conduit 1 and is therefore unreleasable. The connecting element 9 consequently cannot be removed from the pipe conduit 1 after the latter has been cleaned. The device can be demounted only from the stop valve 8. The demounted device can then be used for another pipe conduit to be cleaned or another vessel to be cleaned. The unreleasable connecting element 9 firmly connected to pipe conduit 1 is, in this case, expediently sealed off by means of a dummy flange.

Figure 2:
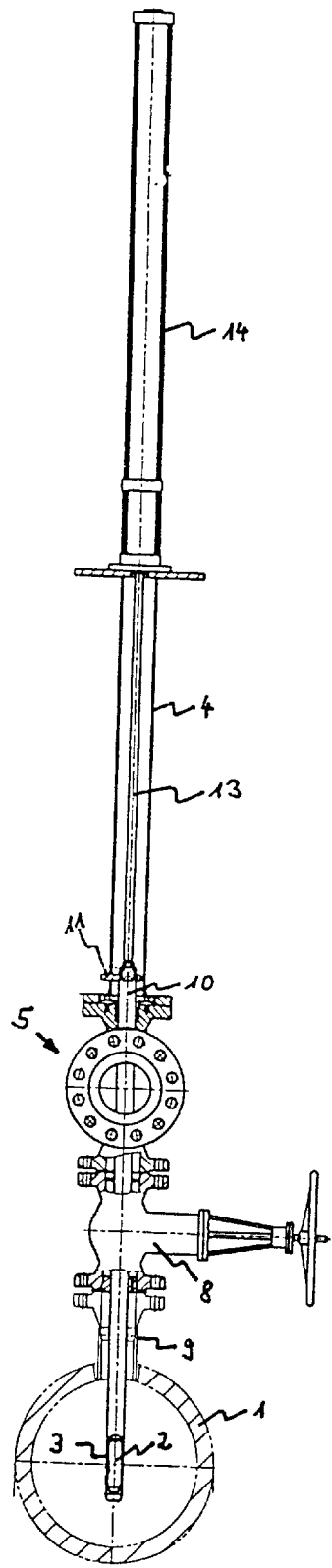
FIG. 2 is a front elevational view of the device of FIG. 1, with the measuring sensor being moved into a second position.

FIG. 2 shows the device from FIG. 1, but the measuring sensor 2, here the metallic measuring mirror, has been moved into a second position. In this second position, the measuring mirror 2 is located in the pipe conduit 1 to be cleaned and fluid flowing through this pipe conduit flows onto said measuring mirror frontally. Particles, in particular dirt particles, which are located in the flow therefore also strike the measuring mirror frontally and leave impact traces behind here. The number of impact traces within a specific period of time may then be evaluated as a measure of the cleanliness of the pipe conduit. In order to determine this number, however, the measuring mirror must be moved into the first position again. The impact traces can be counted after the measuring mirror has been demounted. The latter operation will be advantageous in most cases, since a measuring mirror, once used for measurement, would be suitable only to a limited extent for further measurement because of the impact traces present on it. For this reason, after a measurement has been carried out, the old measuring mirror is, as a rule, demounted from the device. The evaluation of the impact traces can thus take place outside the device. So that a renewed measurement can be made, a new measuring mirror is expediently inserted into the device.

Since the flow in the pipe conduit often has an overpressure or an underpressure relative to the surroundings, the volume element 5 must be sealed off relative to the fluid located in the pipe conduit 1 before the dummy flange attached to the third connecting branch 5''' is removed. For this purpose, the stop valve 8 is closed, so that there can be no outflow of fluid from the pipe conduit 1 or no inflow into the pipe conduit 1.

However, when the measuring mirror is to be moved from the first position into the second position again for the purpose of a measurement, the volume element 5 must first be sealed off again relative to the surroundings by the third connecting branch 5''' being closed. The stop valve 8 is subsequently to be opened, so that the measuring mirror 2 can be moved into the second position.

In order to ensure that the third connecting branch 5''' is opened reliably, particularly when there is a relatively high overpressure or underpressure of the fluid located in the pipe conduit, it is expedient, as illustrated in FIG. 4, to attach a vent valve 17 to the volume element 5. An overpressure or underpressure, which is present in the volume element 5, as compared with the pressure level of the surroundings, can thereby be equalized in an operationally reliable way.

The invention is described in connection with conduits and vessels However, this description, in this context, also includes, in particular, conduit systems, such as, for example, pipe conduit systems branching out in many directions and covering a wide area.

Only the elements and components essential for understanding the invention are shown in the Figures. The devices according to the invention which are illustrated may therefore be supplemented in various ways or else be modified in a way obvious to a person skilled in the art, without the idea of the invention being relinquished or altered as a result.

What is claimed is:

1. A device for moving a measuring sensor into and out of a conduit comprising a holding element for holding the measuring sensor, a guiding element for guiding the holding element and a volume element, the holding element being movable into and out of the volume element, the volume element including a sealing-off device, further comprising a second sealing-off device, by means of which the volume element is capable of being sealed off relative to the surroundings.

2. The device as claimed in claim 1, wherein a stop valve is arranged, as the sealing-off device and is positioned between the conduit and the volume element.

3. The device as claimed in claim 1, including a vent valve communicating with the volume element.

4. The device as claimed in claim 1, including a connecting element with a weld-on flange.

5. A device for moving a measuring sensor into and out of a conduit comprising a holding element for holding the measuring sensor, a guiding element for guiding the holding element and a volume element, the holding element being movable into and out of the volume element, and the volume element including a sealing-off device, wherein the volume element is an essentially T-shaped tubular element with three orifices and with an interspace.

6. The device as claimed in claim 5, wherein one of the orifices includes an inspection orifice for removing the measuring sensor from the holding element and for mounting the measuring sensor in the holding element.

7. A device according to claim 3, further comprising a stop valve arranged as the sealing-off device and is positioned between the conduit and the volume element.

8. A device according to claim 3, further comprising a vent valve communicating with the volume element.

9. A device according to claim 3, further comprising a connecting element with a weld-on flange.

10. A device for moving a measuring sensor into and out of a conduit comprising a holding element for holding the measuring sensor, a guiding element for guiding the holding element and a volume element, the holding element being movable into and out of the volume element, and the volume element including a sealing-off device, wherein the volume element is thermally insulated relative to the conduit.

11. A device according to claim 10, further comprising a stop valve arranged as the sealing-off device and is positioned between the conduit and the volume element.

12. A device according to claim 10, further comprising a vent valve communicating with the volume element.

13. A device according to claim 10, further comprising a connecting element with a weld-on flange.

14. A device for moving a measuring sensor into and out of a conduit comprising a holding element for holding the measuring sensor, a guiding element for guiding the holding element and a volume element, the holding element being movable into and out of the volume element, and the volume element including a sealing-off device, wherein the measuring sensor is a metallic mirror.

15. A device according to claim 14, further comprising a stop valve arranged as the sealing-off device and is positioned between the conduit and the volume element.

16. A device according to claim 14, further comprising a vent valve communicating with the volume element.

17. A device according to claim 14, further comprising a connecting element with a weld-on flange.

18. A method for measuring the cleanliness of a conduit comprising:
  attaching a measuring sensor to a movable holding element while the holding element is located at a first position, the first position being located within a first region which is temporarily sealed off relative to the conduit;
  establishing fluid flow between the first region and the conduit;
  moving the sensor out of the first region into a second region located within the flowing fluid in the conduit;
  holding the sensor in the second region for a predetermined period of time;
  after the end of the predetermined period moving the sensor out of the second region and into the first region;
  sealing-off of the first region relative to the second region; and
  removing the measuring sensor from the holding element for the determination of a measurement value,
  wherein the step of removing the measuring sensor includes:
    opening of a vent valve for achieving pressure equalization between the pressure of the fluid in the first region and a surrounding atmospheric pressure; and
    opening of an inspection orifice in the first region.

19. The method as claimed in claim 18, in which, before establishing fluid flow between the first region and the conduit, the first region is sealed off completely, and, after the end of the predetermined period and following the sealing-off of the first region relative to the fluid, the first region is opened to the surroundings.

20. The method as claimed in claim 18, wherein during cleaning, a metallic mirror is introduced as a measuring sensor into the conduit and/or the vessel for a measurement period and is removed from the conduit after the end of the measurement period, the fluid continuing to flow through the conduit and/or the vessel during the removal of the measuring sensor.

21. Apparatus for measuring the cleanliness of a fluid conduit comprising:

a volume element having a central chamber and a pair of branches extending outward from the chamber in opposite directions, the branches being in axial alignment, a holding element to which is attached a measuring mirror;

a lifting element mounted in axial alignment with the pair of branches, the holding element being mounted on the lifting element;

a connecting element for connecting the volume element to a fluid conduit, the holding element being arranged for selective displacement from the volume element through the connecting element to be positioned within a fluid conduit;

the volume element having an access opening in position to enable the detachment of the measuring mirror from the holding element; and a stop valve mounted between the volume element and the connecting element, the stop valve being arranged in a closed position to seal against fluid flow between the connecting element and the volume element and in the open position permitting the holding element and the lifting element to pass through the stop valve.

22. The apparatus according to claim 21, including a vent valve communicating between the interior of the volume element and the exterior of the volume element.

* * * * *